(12) United States Patent
Belleschi et al.

(10) Patent No.: US 10,791,499 B2
(45) Date of Patent: Sep. 29, 2020

(54) SYSTEM INFORMATION BROADCASTING IN A WIRELESS NETWORK

(71) Applicant: Telefonaktiebolaget LM Ericsson (publ), Stockholm (SE)

(72) Inventors: Marco Belleschi, Solna (SE); Johan Bergman, Stockholm (SE); Emre Yavuz, Stockholm (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 3 days.

(21) Appl. No.: 15/751,504

(22) PCT Filed: Aug. 15, 2016

(86) PCT No.: PCT/EP2016/069352
§ 371 (c)(1),
(2) Date: Feb. 9, 2018

(87) PCT Pub. No.: WO2017/029265
PCT Pub. Date: Feb. 23, 2017

(65) Prior Publication Data
US 2018/0227833 A1 Aug. 9, 2018

Related U.S. Application Data

(60) Provisional application No. 62/205,414, filed on Aug. 14, 2015.

(51) Int. Cl.
*H04W 48/10* (2009.01)
*H04W 4/70* (2018.01)
(Continued)

(52) U.S. Cl.
CPC .......... *H04W 48/10* (2013.01); *H04L 5/005* (2013.01); *H04L 5/0032* (2013.01); *H04W 4/70* (2018.02); *H04W 36/32* (2013.01); *H04W 48/12* (2013.01)

(58) Field of Classification Search
None
See application file for complete search history.

(56) References Cited

U.S. PATENT DOCUMENTS

2009/0185543 A1  7/2009  Chen et al.
2011/0105158 A1  5/2011  Arora et al.
(Continued)

FOREIGN PATENT DOCUMENTS

CN  102687543 A  9/2012
CN  102754487 A  10/2012
(Continued)

OTHER PUBLICATIONS

RAN1, "LS on Observations on SIB Performance for Rel-13 Low-Complexity UE", 3GPP TSG WG1 Meeting #79, San Francisco, CA, USA, Nov. 17, 2014, pp. 1-2, R1-145414, 3GPP.
(Continued)

*Primary Examiner* — Lonnie V Sweet
(74) *Attorney, Agent, or Firm* — Coats & Bennett, PLLC (57) ABSTRACT

The invention refers to a method for providing system information to a user equipment, UE (100), wherein a first access node (140*a*) of a first radio cell selects (S03) a second cell to support the system information broadcasting, and sends (S04) a message to the second access node (140*b*) of the second cell, wherein said message is indicative of a request to jointly broadcast system information, and wherein said request is indicative of the system information to be broadcasted; the invention further refers to corresponding access nodes (140*a*, 140*b*) a user equipment, UE (100), and computer programs.

19 Claims, 6 Drawing Sheets

(51) Int. Cl.
*H04W 36/32* (2009.01)
*H04W 48/12* (2009.01)
*H04L 5/00* (2006.01)

(56) References Cited

U.S. PATENT DOCUMENTS

| | | | |
|---|---|---|---|
| 2012/0309400 A1 | 12/2012 | Inumaru | |
| 2014/0198726 A1 | 7/2014 | Xu et al. | |
| 2014/0293889 A1* | 10/2014 | Mahr | H04L 1/1825 370/329 |
| 2015/0181575 A1* | 6/2015 | Ng | H04W 72/042 370/329 |
| 2015/0271864 A1* | 9/2015 | Nigam | H04W 24/02 370/252 |
| 2015/0282207 A1* | 10/2015 | Ambriss | H04W 36/0055 370/331 |
| 2015/0341949 A1* | 11/2015 | Nagata | H04L 5/0098 370/329 |
| 2016/0037511 A1* | 2/2016 | Vincze | H04B 7/024 370/329 |
| 2016/0249275 A1* | 8/2016 | Yang | H04W 36/08 |
| 2016/0330642 A1* | 11/2016 | Yang | H04W 48/18 |
| 2016/0337106 A1* | 11/2016 | Fang | H04L 5/0082 |
| 2017/0311217 A1* | 10/2017 | Jung | H04W 36/04 |

FOREIGN PATENT DOCUMENTS

| | | |
|---|---|---|
| CN | 102946264 A | 2/2013 |
| CN | 103560816 A | 2/2014 |
| WO | 2007084047 A1 | 7/2007 |
| WO | 2012134538 A1 | 10/2012 |

OTHER PUBLICATIONS

Ericsson, "Broadcasting system information by meansof SFN-transmission in NR", 3GPP TSG-RAN WG2 #95, Aug. 22-26, 2016, pp. 1-3, Goteborg, Sweden, Tdoc R2-165551.

* cited by examiner

SYSTEM INFORMATION BROADCASTING IN A WIRELESS NETWORK

TECHNICAL FIELD

The present invention generally relates to broadcasting system information to terminals of a wireless communication network.

BACKGROUND

In a typical cellular system, also referred to as a wireless communications network, wireless terminals, also known as mobile stations or user equipments communicate via a Radio Access Network (RAN) to one or more core networks. The radio access network may comprise access points (AP) or base stations, BS that communicate with the user equipments by means of radio communications and provide access to the core network.

The Third Generation Partnership Project (3GPP) has established a plurality of generations of mobile communication standards. The Universal Mobile Telecommunications System (UMTS) is a third generation (3G) mobile communication system, which evolved from the Global System for Mobile Communications (GSM) to provide mobile communication services based on Wideband Code Division Multiple Access (WCDMA) access technology. Long-Term Evolution (LTE) often being referred to as fourth generation has been specified to increase the capacity and speed using a different radio interface together with core network improvements. The standard is specified in several releases staring with Release 8 document series, and comprising enhancements described in further releases.

For most of the history of cellular communications the goal has been to provide services between people. Accordingly, LTE has been originally developed in order to provide advanced performances in terms of capacity and speed over WCDMA.

The LTE standard provides the technological framework to allow the end-user to enjoy the mobile broadband quality of service, i.e. high data rates and low latency. The increased availability of mobile broadband opens the possibility to further types of wireless communications that might not directly be driven by human beings. Compared with regular cellular communications, Machine-Type-Communications (MTC) also known as Machine-to-Machine (M2M) communications or Internet of Things (IoT), are often characterized by specific traffic profiles that sometimes consist of relatively relaxed requirements both in terms of amount of data to be transferred (few Kbits for simple sensors) and latency constraints. As such, the existing LTE standard (prior to Release 13) and to some extent also older (2G/3G) technologies may in principle already handle this new emerging type of communications.

However, MTC embraces a large variety of machines in manifold applications which requirements may vary a lot, from low-cost sensors for environmental monitoring, to smart meters for traffic safety and control, to actuators for automatizing industrial processes, or smart grids for reducing the carbon footprint. While low-cost and low-energy sensors do not typically imply strict constraints in terms of latency, they may pose new challenges to the existing LTE network in terms of the necessary signaling to handle a potentially massive number of devices, as well as in terms of their power-efficient management. On the other hand, mission-critical machines may not have special energy-savings demands but require ultra-reliable and very low-latency connection.

As discussed above, machine-type communications often involve only small amounts of data sent infrequently, preferably using low cost infrastructure. With the focus on MTC, UE categories or types more suited to the (lower) requirements of MTC may be specified comprising types indicating a reduced UE bandwidth of in downlink and/or uplink,
 a reduced maximum UE transmit power,
 a reduced support for downlink transmission modes,
 a reduced maximum transport block size (for unicast and/or broadcast signalling),
 a reduced support for simultaneous reception of multiple transmissions,
 a reduced physical data channel processing (e.g. relaxed downlink HARQ time line or reduced number of HARQ processes), and
 a reduced support for CQI/CSI reporting modes.

Since a huge number (e.g. to 50 billion) devices are expected to be connected wirelessly during the next decade and since a significant part of them are expected to be MTC devices, current LTE networks may face challenges both in the radio access network (RAN) domain and in the Core Network (CN) domain to cope with above-mentioned demands.

According to current LTE standards, once a user equipment (UE) has acquired downlink synchronization to a specific cell by successfully decoding specified synchronization signals (Primary Synchronization Signal (PSS) and Secondary Synchronization signal (SSS)), it has also acquired the physical layer identity of that cell. As a consequence, the UE may start sensing the cell-specific reference signals (CRS) that in turn may be used to measure the cells Reference Signal Received Power (RSRP) for channel estimation purposes, e.g. to perform cell selection, and also to carry out coherent demodulation of the downlink channels.

In particular, after performing the cell search procedure and identifying the cell-specific reference signal, the UE is able to acquire cell system information that is periodically broadcasted by the evolved Node B (eNB) via the so-called Broadcast Control Channel (BCCH). Without this critical piece of information, the UE cannot access the network and operate properly within the cell.

On a more detailed level, the system information in the BCCH may be broadcasted following two different methods. The Master-Information Block (MIB) information containing a limited amount of system information is transmitted via the Broadcast Channel (BCH), while the System-Information Block (SIB) information containing the majority of the system information is transmitted via the Downlink-Shared Channel (DL-SCH) that is therefore shared with the dedicated user data transmissions.

The reason for this splitting is due to the fact that MIB carries critical system information, e.g. the downlink bandwidth, the Physical Hybrid-ARQ Indicator Channel (PHICH) configuration and the system frame number that is necessary to acquire the other system information provided by the SIBs. Thus, MIB uses a special envelope with reduced overhead, higher periodicity (40 ms), and different channel coding (a convolutional encoder is used for BCH rather than a Turbo-encoder that is less suitable for the smaller transport block size of the BCH). The SIBs instead are transmitted via the DL-SCH and their modulation format as well as the frequency-domain allocation, namely the Physical Resource Blocks (PRB) allocation, is signaled by the Physical Downlink Control Channel (PDCCH) whose decoding is possible upon knowledge of PHICH configuration carried in the MIB. Since, as previously mentioned, the PDSCH is shared with the normal user-data transmissions, the presence of SIB in the transmitted PDSCH is announced by the SI-RNTI flag in the PDCCH. 3GPP TS36.331, currently actual version 12.6.0, June 2015, defines seventeen different types of SIBs each carrying different type of information that is more or less critical. Usually lower order SIBs comprise more relevant information and is being transmitted more often, whereas higher order SIBs are less critical and can be transmitted more sporadically or even not at all, e.g. if they are feature-dependent.

MIB and SIB type 1 (SIB1) adopt a similar transmission technique, i.e. a certain MIB/SIB1 transport block is periodically transmitted from layer 3 (MIB every 40 ms, SIB1 every 80 ms) and repeated by the physical layer (MIB repetition every 10 ms, SIB1 every 20 ms) with a different redundancy version to puncture the encoder output. So from this perspective MIB/SIB1 transmissions follow a HARQ-like procedure even though no UL feedback is sent, and the UE can perform soft combining of the different repetitions. On the other hand, the periodicities of the other SIB types are configurable by the operator along with the length of the transmission window (communicated to the UE by the SIB1) that determines for how many subframes a certain SIB has to be transmitted. In this way, a UE missing the SIB in one subframe still has the opportunity to successfully decode it in the subsequent subframes within the given transmission window.

Regardless the type of UE (e.g. low complexity MTC-UE with a single receive antenna only, or a multiple antenna UE), or whether the UE operates in difficult radio environments (e.g. in enhanced coverage) or not, the UE needs to acquire system information in order to access the network.

The transport blocks containing system information (either SIBs or MIB) may be quite large. As an example, it may be estimated that 100-150 repetitions are required for a system information message with a size of only 328 bits resulting in an acquisition time of 2-3 seconds. Such high number of repetitions may further lead to significant power consumption from the battery of the UE that has to monitor the broadcast channel for quite a long time. Additionally, it may also impact the radio access latency that might be critical for some MTC applications as mentioned. (Recently performed Rel-13 work on Cellular IoT comprises a deployment option where the system bandwidth is as small as 200 kHz. With the demanding coverage requirements, the DL power spectral density may have to be relatively high, which may result in relatively large inter-cell interference for e.g. due to SIB transmissions).

SUMMARY

It is an object to improve a reception of system information broadcasted by the network at a UE. More specifically, it is an object to develop a protocol to enable an enhanced broadcasting by cooperation of two or more cells in the coverage area of a UE.

According to embodiments, system information is provided to a user equipment, UE, wherein the following steps are performed at a first access node of a first radio cell:
broadcasting the system information to the UE;
selecting a second cell to support the system information broadcasting, and
sending a message to a second access node of the second cell, wherein said message is indicative of a request to jointly broadcast system information, and wherein said request is indicative of the system information to be broadcasted.

In embodiments, a second access node of a second radio cell performs the following steps:
receiving a request from a first access node of a first cell to support the system information broadcasting, and
broadcasting the system information according to the request.

Such embodiments may have the advantage that the strength of the received signal containing system information, SIB, is enhanced, in order to improve (accelerate or even enable) a decoding of said information at the UE.

As a further advantage, the latency in SIB decoding may be reduced thus providing a faster way to access network services. Additionally, the reduction in the number of decoding attempts may also reduce battery consumption of the UE.

As a further advantage, low-complexity UEs may be placed in environments, where maintaining a good enough coverage may be difficult, e.g. MTC-UEs operating in remote rural areas, underground or in building basements.

Further embodiments concern corresponding access nodes, and a corresponding UE.

Further embodiments concern computer programs comprising portions of software codes in order to implement the method as described above when operated by a respective processing unit of the UE or wireless device, or the access nodes or base stations. The computer programs can be stored on a computer readable medium. The computer-readable medium can be a permanent or rewritable memory within the wireless or network node, or located externally. The respective computer program can be also transferred to the respective wireless device or network node for example via a cable or a wireless link as a sequence of signals.

In the following, detailed embodiments of the present invention shall be described in order to give the skilled person a full and complete understanding. However, these embodiments are illustrative and not intended to be limiting.

BRIEF DESCRIPTION OF THE DRAWINGS

The accompanying drawings illustrate several aspects of the disclosure, and together with the description serve to explain the principles of the disclosure.

DETAILED DESCRIPTION

Figure 1:
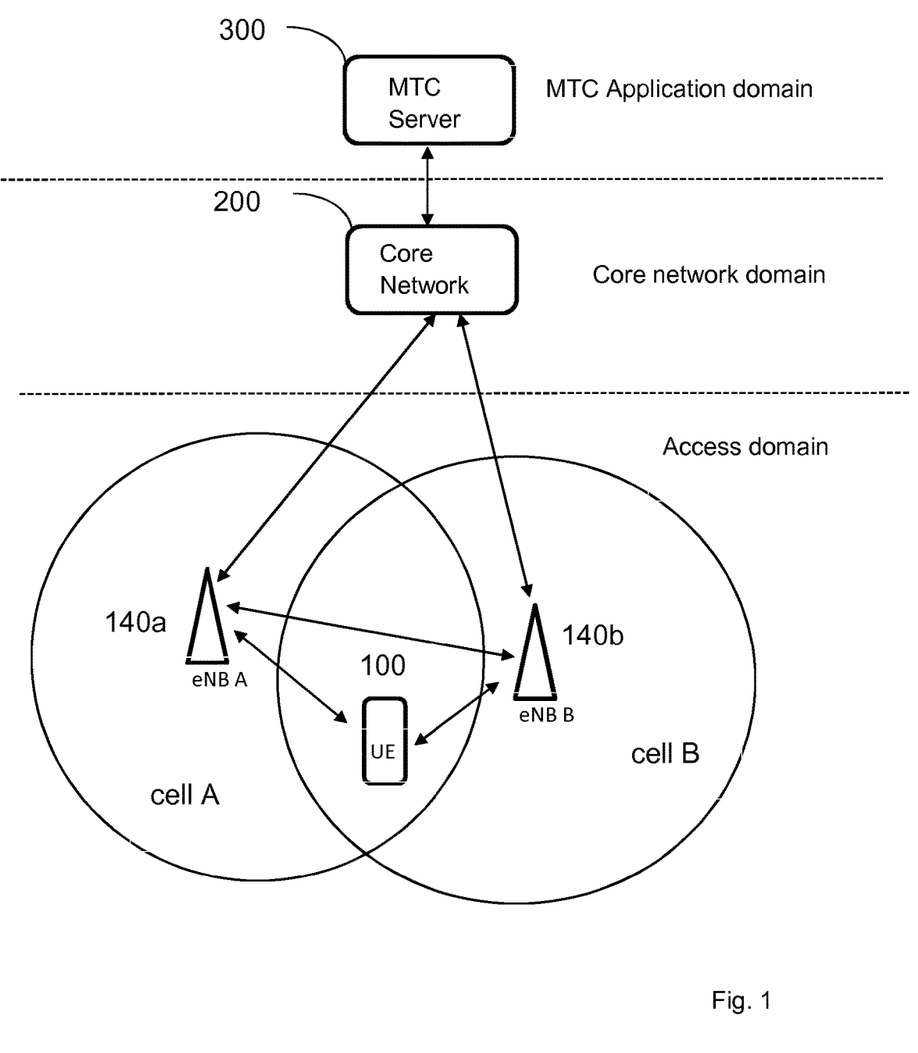
FIG. 1 illustrates an example of a cellular communications network implementing a system information broadcasting to wireless devices communicating with the network according some embodiments of the present disclosure.

As shown in FIG. 1 the example access domain may exemplarily comprise a plurality of cells, (first) cell A and (second) cell B. Each cell may be served by one or a plurality of access points in the context of LTE. In the example of FIG. 1, cell A is served by a first eNB 140a, and cell 2 is served by a second eNB 140b. Further exemplarily, FIG. 1 shows a wireless communication device or UE 100 suited for machine type communication. In the following, the wireless communication device is being referred to as UE or MTC-UE 100.

Further, FIG. 1 shows a core (CN) network domain comprising one or a plurality of CN nodes, whereof one CN node 200 is depicted by example, and an MTC application domain comprising one or a plurality of MTC servers, whereof one MTC server 300 is depicted by example. The MTS server 300 is connected to the core network server 200. The core network server 200 is connected to the access network nodes (eNB 140a and eNB 140b). The access network nodes are connected to each other and provide connection to wireless communication devices within coverage of the respective cells. In the example of FIG. 1, the UE 100 is in coverage of both cells. The MTC server(s) 300 may provide applications to selected UE(s) e.g. to MTC-UEs. The MTC server 300 may also provide presence or location information of selected UE(s) to appropriate access nodes.

In the following, embodiments will be described wherein the UE 100 acquires system information from the access network in order to connect to a certain (selected) cell of the access network (cell A). Thereto, the UE 100 receives broadcasted system information associated that cell. Such system information may be broadcasted by a respective eNB (or one or a plurality of access points) of that cell. According to embodiment described below, a plurality of cells may co-operate to provide the system information of the certain cell to the UE.

In the following, cells communicating with each other and/or with the UE 100 are being described. This may mean that appropriate nodes of these cells communicate with each other and/or with the UE 100. In case that the cells are established by each one eNB, this may mean that the corresponding eNBs communicate to each other and/or to the UE 100.

Embodiment 1

In this embodiment, a first cell (e.g. first eNB 140a according to FIG. 1), also being referred to as cell A, which may support UEs capable of MTC, in the following also being referred to as MTC-UE, may periodically broadcast SIB information. Cell A may be aware of the presence of a certain (MTC-) UE or a group of (MTC-) UEs under its coverage from (most) recent measurements, e.g. recent uplink transmissions, and/or recent handover request acknowledge in the cell, and/or from operator configuration e.g. provided by the MTC server that may e.g. communicate a presence of the MTC group (and related service applications) to the cell A.

When broadcasting system information (SIB), cell A may figure out that a corresponding (SIB) detection is not or will not be successful for the UE or UEs of the group of UEs.

Certain conditions may be evaluated by Cell A to determine that enhanced system broadcasting shall be performed in order to mitigate detection problems.

Thereto Cell A may observe an uplink synchronization determine such detection problem be observing a lack of uplink synchronization requests (random access) for a certain period of time. Such period of time may be dependent on the application type of the UE, i.e. on the specific UE category. Further or alternatively, also RLC failures and/or suddenly increased block error rate (BLER) and/or a lack of hybrid automatic repeat request (HARQ) feedbacks e.g. after a system information update, can be used by cell A as an indication of a loss of SIB at the UE. Further, poor channel quality recently reported may alternatively or additionally serve as an indication that the UE is experiencing bad radio coverage.

Thereto, if the certain conditions are met, cell A trigger the enhanced system broadcasting by requesting a second cell (second eNB), also being referred to as cell B to jointly transmit the SIB to cell B. Such request may be performed by sending a joint broadcasting request message, in the following also being referred to as JointSIBReq from cell A to cell B. The JointSIBReq may comprise information indicating or containing the type of information to be transferred, e.g. SIB type and a related content. Such request may further comprise any information indicative of the time/frequency resource (e.g. subframe index, PRB allocation), reference signal sequences as well as the MCS and TBS to use by cell B for the system information broadcasting.

The request may further comprise some pre-coding information that cell B can use to steer the SIB from cell B once the channel phase difference between cells is acquired, e.g. according for instance to periodic RSRP measurement reports and PMI reports received by the UE.

In another solution, e.g. for certain types of (low-complexity) UEs, no-precoding is applied, but cell A and cell B may adopt transmit diversity (e.g. with space-frequency block coding) to boost the power received at the UE.

After a reception of JointSIBReq, cell B may evaluate the request and send back a feedback message to Cell A, in the following also being referred to as JointSIBReqFeedback. Such feedback may comprise a positive or negative acknowledgement with respect to the request received from cell A. A positive acknowledgement may mean that cell B will start or is ready to start broadcasting the same system information. A negative feedback may mean that cell B will not or is not capable of broadcasting the system information.

In an embodiment, in response to the JointSIBReq, Cell B may propose a different scheduling allocation, e.g. a different time/frequency allocation e.g. because of different operating bandwidths of both cells, or of not available resources at cell B (e.g. due to an actual high load). Additionally or alternatively cell B may propose to change SIB scheduling to avoid harmful interference e.g. if another SIB transmission is planned in the same TTI. Such proposal(s) may be inserted into the JointSIBReqFeedback.

In an embodiment, a defined event may trigger to terminate the joint broadcasting procedure, e.g. an expiration of a certain time (that may be preconfigured or exchanged with the request), or detecting that the UE supposed to camp on cell A has resumed the uplink transmission activities. A termination policy to be applied by Cell B may preconfigured and/or be part of the JointSIBReq.

Figure 2:
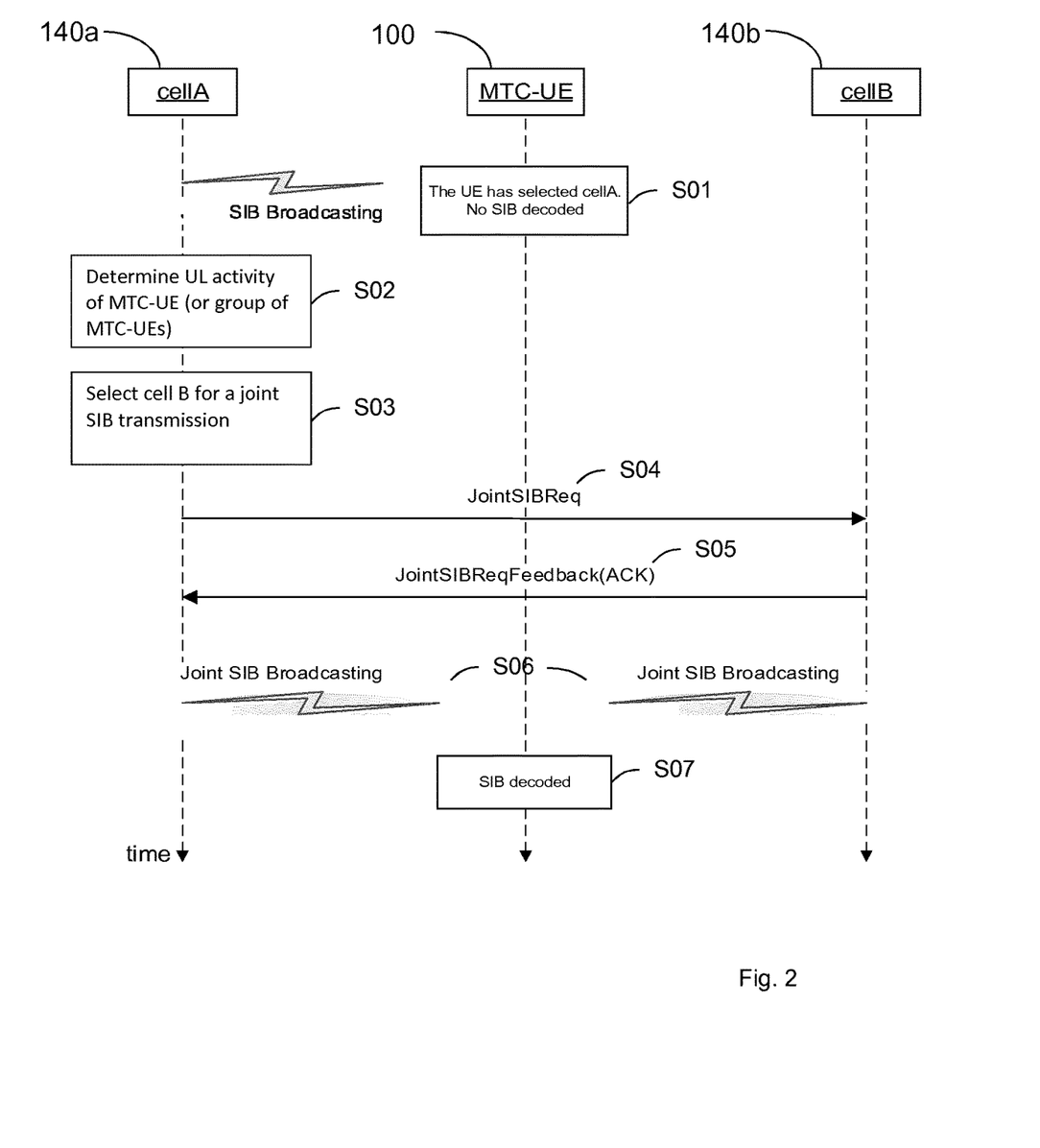
FIG. 2 illustrates a first exemplary sequence of messages and steps performed by access nodes according to some embodiments of the present disclosure.

FIG. 2 illustrates an example sequence of functions and messages according to the above description performed by first eNB 140a of cell A (in the following also simply being referred to as cell A), second eNB 140*b* of cell B (in the following also simply being referred to as cell B), and the UE 100. Initially, the UE 100 is not connected to any cell A or cell B. Cell A may periodically broadcast system information to be acquired by UEs to connect to that cell.

In a first step S01, while receiving the broadcasted system information, the UE 100 performs a cell selection. After the successful execution of the cell-search procedure described previously, the UE 100 is able to decode the Physical Broadcast Channel (PBCH) and read system information (from the Master Information Block (MIB) and system Information Blocks (SIBs) broadcasted by the selected Cell A.

In a second step S02, cell A detects that there is no UL activity from the UE (or group of UEs).

In a third step S03, cell A selects cell B to support the SIB broadcasting.

In a fourth step S04, cell A sends a request, JointSIBReq, for a joint broadcasting of the system information to selected cell B.

In a fifth step S05, Cell B sends a response, JointSIBReqFeedback, to Cell A. This response may comprise an acceptance (positive acknowledge), a denial (negative acknowledge) or a change proposal. In case of a change proposal, a corresponding feedback may be send from cell A to Cell B, e.g. comprising an acceptance or a denial. In the example depicted in FIG. 2, cell B positively acknowledges the JointSIBReq by sending a positive feedback to Cell A.

In a sixth step S06, Cell B starts to broadcast the system information (jointly with Cell B).

In a seventh step S07, the UE performs a joint detection of the broadcasted system information.

Embodiment 2

This embodiment proposes a way to perform the joint system information broadcasting (SIB) in a given PDSCH by a plurality of cells (e.g. cell A and cell B) from physical layer perspective.

As specified in current 3GPP standards, cell A announces the presence of SIB with the SI-RNTI in the PDCCH. It is proposed that cell B transmits the SIB without corresponding SI-RNTI in its PDCCH, as other UEs camping in cell B do not need to decode the joint SIB broadcasting from cell B that is intended to MTCs in cell A.

Embodiment 3

A problem may arise from the fact that in order to coherently reconstruct the SIB information contained in the PDSCH from cell A and cell B, the UE needs proper channel estimation for coherent demodulation. Assuming that the UE has selected cell A during cell selection, it will not use cell-specific reference signals (CRS) of cell B to decode the corresponding SIB. This may potentially result in an incoherent combining at UE side.

As a solution, it is proposed that that cell A and cell B share the same physical identity for a specific SIB transmission (e.g. transmitting identical CRS Zadoff-Chu sequences on the same resource elements).

Thereto, cell A may send information indicative of the CRS of Cell A to Cell B; such information may be comprised by the JointSIBReq.

Such embodiment may be preferably applied in deployments, wherein the supporting cell B is a small cell with low traffic.

The JointSIBReqFeedback transmitted back from cell B to cellA shall take into consideration the actual load in cell B.

Embodiment 4

This embodiment proposes an alternative to Embodiment 3 to using UE specific downlink DM-RS both in cell A and cell B in the time/frequency resources allocated for SIB. The resource elements to use for DM-RS can be signaled in the JointSIBReq. Compared with Embodiment 3, this approach may not impact UEs connected to cell B, since cell B CRS can be still broadcasted in every subframe for coherent demodulation and channel estimation purposes.

Since this embodiment leverages UE-specific DM-RS, this embodiment may be applied in case that a specific MTC device needs to be addressed. For instance it can be the case of a mission-critical MTC device that requires very tight latency requirements, or an MTC UE that has not been sensed by the network for a long time and thus need a dedicated SIB transmission.

Embodiment 5

This embodiment (as an alternative to Embodiments 3 and 4) proposes to create a reference signal (RS) specific for the group of MTC devices that are camping in cell A. For instance this RS may comprise a pseudo-random sequence generated on the basis of the slot number and the MTC group identity that may be application specific for the end-user subscribing the MTC service. This group identity can be communicated by the MTC server, e.g. located in or associated to the core network connected to the cell A. Cell A may use this information to generate the pseudo-random MTC-specific RS. In turn, cell A may communicate appropriate information (e.g. the sequence seed and MTC group identity) to the cell B such that the cell A and cell B in conjunction with the joint SIB transmission will map the MTC-specific RS in the same resource elements in OFDM resource grid.

Figure 3:
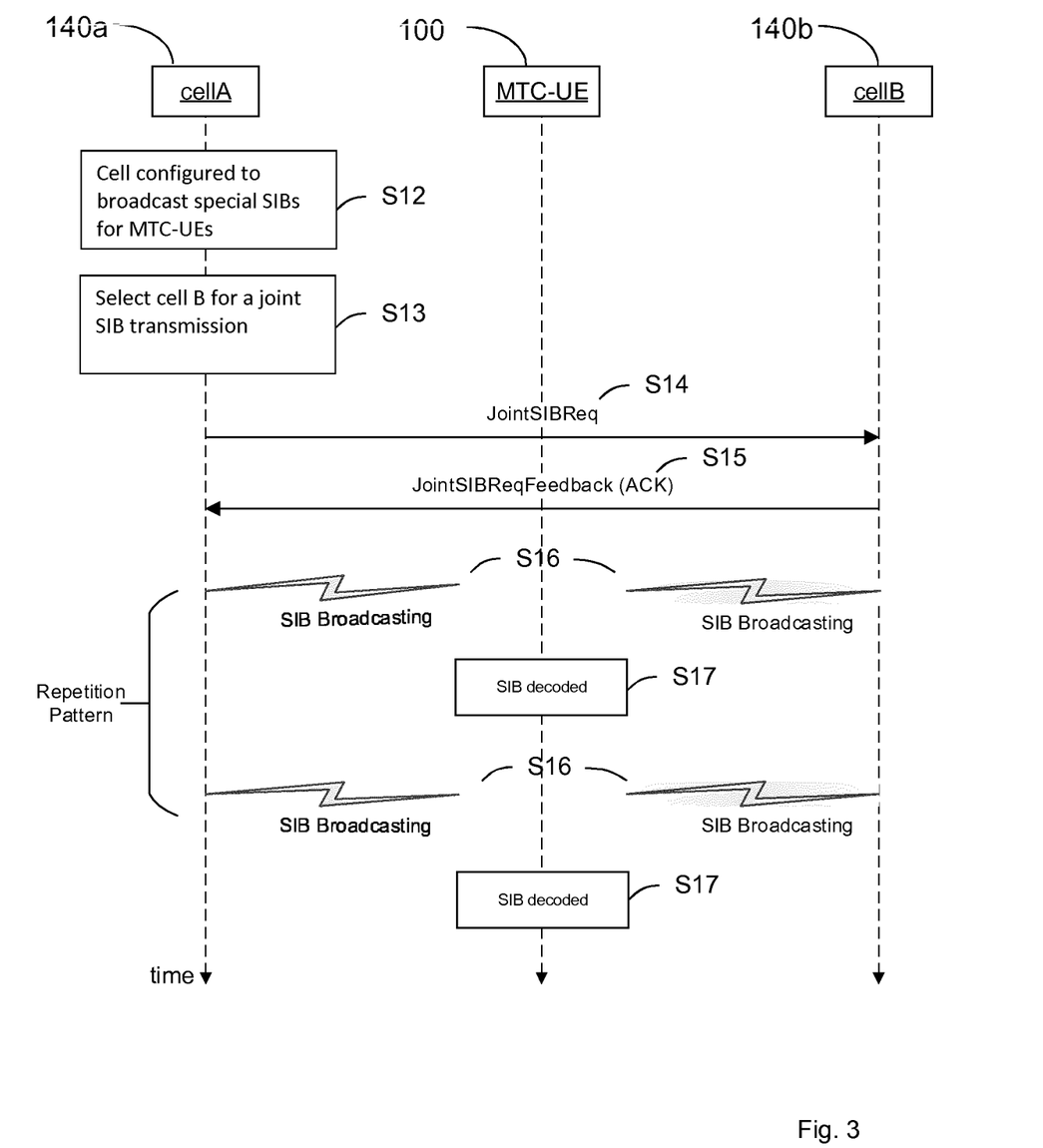
FIG. 3 illustrates a second exemplary sequence of messages and steps performed by access nodes according to some embodiments of the present disclosure.

Thereto, FIG. 3 illustrates an example sequence of functions and messages. In a first step S12 (of this embodiment), Cell A is being (e.g. semi statically) configured to broadcast special system information (special SIBs) for a certain type of UEs (e.g. MTC-UEs).

In a second step S13 (of this embodiment), similarly to step S03 of FIG. 2, cell A selects cell B to support the SIB broadcasting.

In a third step S14 (of this embodiment), similarly to step S04 of FIG. 2, cell A sends a request, JointSIBReq, for a joint broadcasting of the system information to selected cell B.

In a fourth step S15 (of this embodiment), similarly to step S05 of FIG. 2, Cell B sends a response, JointSIBReqFeedback, to Cell A. Similarly to FIG. 2, this response may comprise an acceptance (positive acknowledge), a denial (negative acknowledge) or a change proposal. In case of a change proposal, a corresponding feedback may be send from cell A to Cell B, e.g. comprising an acceptance or a denial. In the example depicted in FIG. 3, cell B positively acknowledges the JointSIBReq by sending a positive feedback to Cell A.

In a fifth step S16 (of this embodiment), Cell B starts to broadcast the system information (jointly with Cell B).

In a sixth step S17 (of this embodiment), the UE 100 performs a joint detection of the broadcasted system information.

Steps S16 and S17 may be repeated according to a certain repetition pattern.

Embodiment 5 may be advantageous applied to send SIB information to a large number of MTC devices belonging to the same group of devices, i.e. running the same type of application.

Embodiment 6

In this embodiment, the proposed joint SIB transmission applies only for specific system information, e.g. only those SIBs targeting certain types/categories of UEs (e.g. only (certain) MTC devices). The specific SIBs requiring the joint transmission may be (semi-statically) configured at cell setup.

Such embodiment may simplify a coordination scheme between cell A and cell B. For instance, cell A and cell B can decide on a long-time scale basis on which periodicity and repetition pattern to broadcast information to the MTC devices. Time/frequency resources, link adaptation parameters and precoding may be negotiated on a faster time scale or reserved. In this way, whenever the transmission of those SIBs is required, cell A and cell B will broadcast that information simultaneously.

A possible application for this embodiment can be for scenarios in which MTC devices are deployed in environments where it is hard to provide a good radio coverage, e.g. devices deployed in building basements or in remote rural areas or operating underground.

Embodiment 7

In this embodiment, rules to select the supporting cell or plurality of cells (e.g. the cell B according to above-described embodiments) to support the joint transmission of SIB information from cell A is proposed.

The decision can be made on the basis of RSRP measurements from the UE when periodic measurement reports are received at cell A.

Additionally, considering typical semi static MTC devices, cell A can probe different cells (cell B and possible further cells) in the surroundings on a certain (slow) time scale until a suitable cell (or a plurality of suitable cells) that promise(s) a reliable SIB broadcasting is (are) found.

Figure 4:
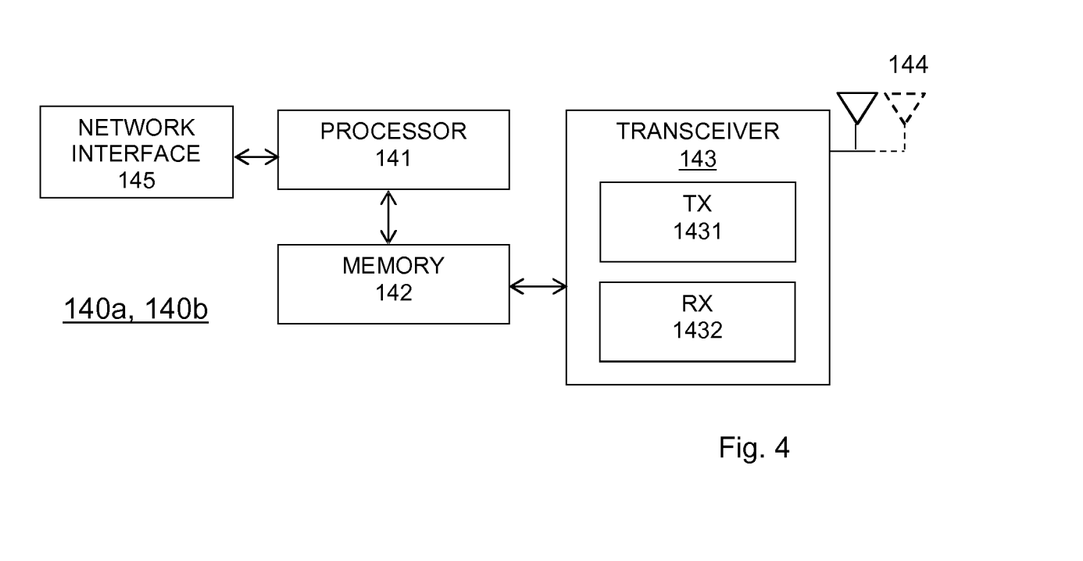
FIG. 4 is a block diagram of structural units of an access node according to some embodiments of the present disclosure.

As shown in FIG. 4, an example access node or eNB 140a or 140b includes a node processor 141, a node memory 142, a node transceiver 143, one or a plurality of node antennas 144 and a network interface 145. The node processor 141 is coupled to the node memory 142, to the network interface 145 and the node transceiver 143 that is coupled to the one or the plurality of node antennas 144. The node transceiver 143 comprises a transmission circuit TX 1431 and a receiver circuit RX 1432. In particular embodiments, some or all of the functionality described above as being provided by cell A, cell B, eNB 1 or eNB 2, and/or any other type of network node may be provided by the node processor executing instructions stored on a computer-readable medium, such as the node memory 142. Alternative embodiments of the radio access node may include additional components responsible for providing additional functionality, including any of the functionality identified above and/or any functionality necessary to support the solution described above.

Figure 5A:
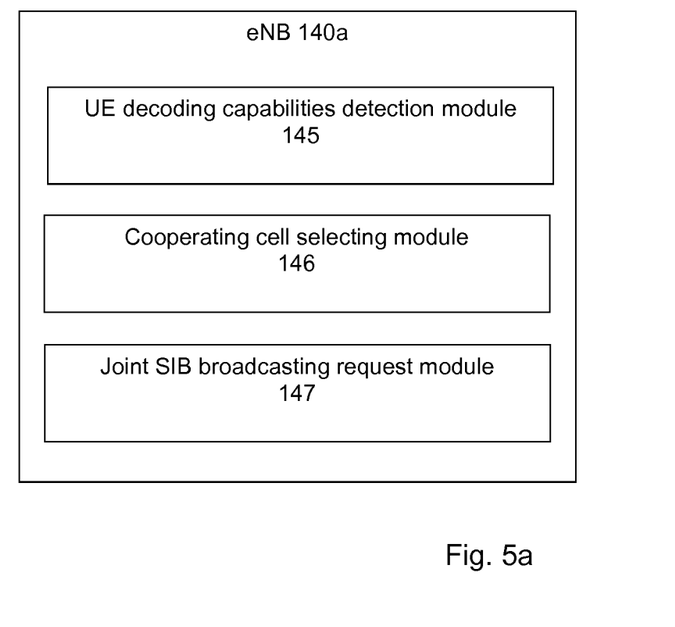
FIG. 5a is a first exemplary block diagram of functional units of an access node according to some embodiments of the present disclosure.

As shown in FIG. 5a, the example access node or eNB 140a or 140b includes the following exemplary functional units:

a UE decoding capabilities detection module 145 adapted to evaluate whether a system information broadcasting shall be enhanced in order to enable or accelerate system information decoding at the UE;

a cooperating cell selection module 146 adapted to select a cell for cooperation; and a joint system information request module 147 adapted to generate a request comprising information to provide a joint system information broadcasting to be sent to the selected cell.

Figure 5B:
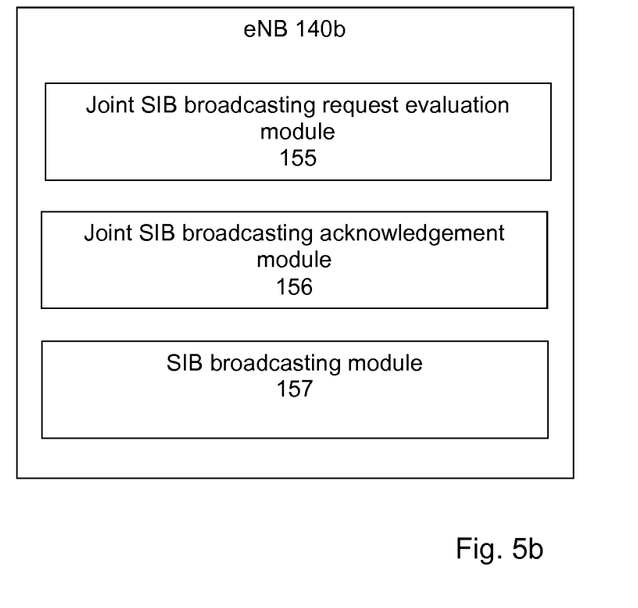
FIG. 5b is a second exemplary block diagram of functional units of an access node according to some embodiments of the present disclosure.

As shown in FIG. 5b, the further example access node or eNB 140a or 140b includes the following exemplary functional units:

a request evaluation module 155 adapted to evaluate the joint system information broadcasting request received from a first access node;

an feedback generation module 155 adapted to generate an appropriate feedback (accept, denial, change proposal) to the first access node; and a system information broadcasting module 147 adapted to broadcast the system information jointly with the first access node such that a reception at the UE is improved.

Figure 6:
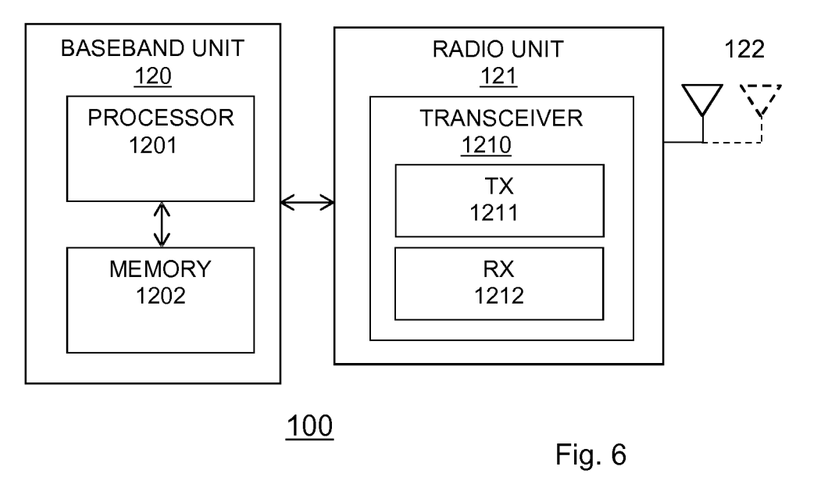
FIG. 6 is a block diagram of structural units of the wireless device according to some embodiments of the present disclosure.

As shown in FIG. 6, an example wireless communication device or UE 100 includes a baseband unit 120, a radio unit 121 and one or a plurality of antennas 122. The baseband unit 120 is coupled to the radio unit 121. The baseband unit 120 comprises a device processor 1201 and a device memory 1202. The radio unit 121 comprises a transceiver 1210 that is coupled to the one or a plurality of antennas 122. The transceiver comprises a transmission circuit TX 1211 and a receiver circuit RX 1212. In particular embodiments, some or all of the functionality described above as being provided by above-described UEs, MTC or M2M devices, and/or any other types of wireless communication devices may be provided by the device processor 1201 executing instructions stored on a computer-readable medium, such as the device memory 1202. Alternative embodiments of the wireless communication device may include additional components beyond those shown here that may be responsible for providing certain aspects of the device's functionality, including any of the functionality described above and/or any functionality necessary to support the solution described above.

Figure 7:
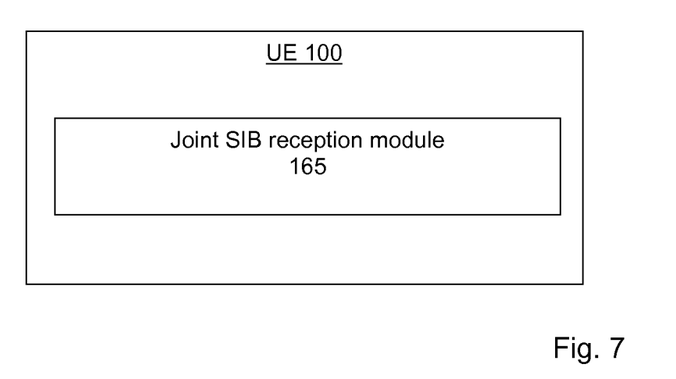
FIG. 7 is a block diagram of functional units of the wireless device according to some embodiments of the present disclosure.

As shown in FIG. 7, UE 100 includes the following exemplary functional unit:

a joint system information reception module 165 adapted to decode the system information from signals jointly broadcasted by two access nodes.

Abbreviations

UE User Equipment
M2M Machine To Machine
MTC Machine-Type Communication
IoT Internet of Things
SIB System Information Block
MIB Master Information Block
HARQ Hybrid Automatic Repeat Request
RSRP Reference Signal Received Power
RRC Radio Resource Configuration
PRB Physical Resource Block
PSS Primary Synchronization Signal
SSS Secondary synchronization signal
PUCCH Physical Uplink Control Channel
PUSCH Physical Uplink Shared Channel
PDCCH Physical Downlink Control Channel
PDSCH Physical Downlink Shared Channel
PHICH Physical Hybrid-ARQ Indicator Channel BCH Broadcast Channel
BCCH Broadcast Control Channel
CRS Cell Specific Reference Signal
DM-RS Demodulation Reference Signal
SI System Information
RNTI Radio Network Temporary Identifier
PMI Precoding Matrix Indicator
RI Rank Indicator
CQI Channel Quality Indicator
MBMS Multimedia Broadcast/Multicast Services

The invention claimed is:

1. A method for providing system information to a user equipment (UE), the method comprising a first access node of a first radio cell:
   determining that the UE may not successfully decode the system information transmitted by the first radio cell, wherein the determining comprises at least one of:
      detecting a lack of uplink synchronization requests for a certain period of time;
      detecting an increased block error rate;
      detecting a lack of hybrid automatic repeat request feedbacks; or
      detecting poor channel quality from recent reports,
   selecting a second cell to support the system information broadcasting in response to determining that the UE may not successfully decode the system information; and
   sending a message to the second access node of the second cell, wherein the message is indicative of a request to jointly broadcast system information, and wherein the request is indicative of the system information to be broadcasted.

2. The method of claim 1, further comprising the first access node, prior to the selecting the second cell, evaluating whether a system information broadcasting shall be enhanced in order to enable or accelerate system information decoding at the UE.

3. The method of claim 1, further comprising broadcasting the system information to the UE.

4. The method of claim 1, wherein the request comprises a type of system information to be broadcasted and a related content.

5. The method of claim 1, wherein the request comprises information indicative of at least one of:
   a time/frequency resource to be used by the second access node for the system information broadcasting;
   a reference signal sequence to be used by the second access node for the system information broadcasting;
   a modulation coding scheme to be used by the second access node for the system information broadcasting; and
   a transport block size to be used by the second access node for the system information broadcasting.

6. The method of claim 1, further comprising the first access node detecting a presence of the UE.

7. The method of claim 6, wherein detecting the presence comprises evaluating at least one of:
   recent measurements;
   recent uplink transmissions;
   recent handover request acknowledge messages;
   an operator configuration.

8. The method of claim 1, wherein the period of time is dependent on a UE category, and further comprising:
   the first access node determining the UE category of the UE; and
   the first access node determining the certain period of time as a function of the determined UE category.

9. The method of claim 1, further comprising the first access node receiving a feedback message from the second access node in response to sending the message.

10. The method of claim 9, further comprising the first access node decoding, from the feedback message, at least one of:
    an acknowledgement to perform joint system information broadcasting;
    a denial to perform the broadcasting;
    a request to change certain parameters for the broadcasting.

11. A first access node, comprising:
    processing circuitry;
    memory containing instructions executable by the processing circuitry whereby the first access node is operative to:
       evaluate whether a system information broadcasting shall be enhanced in order to enable or accelerate system information decoding at a User Equipment (UE);
       determine that the UE may not successfully decode the system information transmitted by the first access node by one or more of:
          detecting a lack of uplink synchronization requests for a certain period of time;
          detecting an increased block error rate;
          detecting a lack of hybrid automatic repeat request feedbacks;
          detecting a lack of HARQ feedbacks after a system information update; or
          detecting poor channel quality from recent reports;
       select a second access node for cooperation; and
       generate a request to be sent to the second access node, the request comprising information to provide a joint system information broadcasting.

12. The access node of claim 11, wherein the instructions are such that the first access node is operative to broadcast the system information to the UE.

13. The access node of claim 11, wherein the request comprises a type of system information to be broadcasted and a related content.

14. The access node of claim 11, wherein the request comprises information indicative of at least one of:
    a time/frequency resource to be used by the second access node for the system information broadcasting;
    a subframe index or PRB allocation to be used by the second access node for the system information broadcasting;
    a reference signal sequence to be used by the second access node for the system information broadcasting;
    a modulation coding scheme to be used by the second access node for the system information broadcasting; and
    a transport block size to be used by the second access node for the system information broadcasting.

15. The access node of claim 11, wherein the instructions are such that the first access node is operative to detect a presence of the UE.

16. The access node of claim 11, wherein the instructions are such that the first access node is operative to:
    determine a UE category of the UE;
    determine the certain period of time as a function of the determined UE category.

17. The access node of claim 11, wherein the instructions are such that the first access node is operative to receive a feedback message from the second access node in response to sending the request.

18. The access node of claim 17, wherein the instructions are such that the first access node is operative to decode, from the feedback message, at least one of:
- an acknowledgement to perform joint system information broadcasting;
- a denial to perform the broadcasting;
- a request to change certain parameters for the broadcasting.

19. A non-transitory computer readable recording medium storing a computer program product for controlling a first access node of a first radio cell for providing system information to a user equipment (UE), the computer program product comprising software instructions which, when run on processing circuitry of the first access node, causes the first access node to:
- determine that the UE may not successfully decode the system information transmitted by the first access node by one or more of:
  - detecting a lack of uplink synchronization requests for a certain period of time;
  - detecting an increased block error rate;
  - detecting a lack of hybrid automatic repeat request feedbacks; or
  - detecting poor channel quality from recent reports,
- select a second cell to support the system information broadcasting in response to determining that the UE may not successfully decode the system information; and
- send a message to the second access node of the second cell, wherein the message is indicative of a request to jointly broadcast system information, and wherein the request is indicative of the system information to be broadcasted.

* * * * *